United States Patent [19]
Farina et al.

[11] Patent Number: 5,235,937
[45] Date of Patent: Aug. 17, 1993

[54] DEVICE FOR AUTOMATICALLY WASHING TEATS OF DAIRY ANIMALS

[75] Inventors: Felice Farina; Emilio Lucchini; Renato Federici, all of Cremona, Italy

[73] Assignee: Gilna Corporation N.V., Curacao, Netherlands

[21] Appl. No.: 886,002

[22] Filed: May 18, 1992

[30] Foreign Application Priority Data

May 20, 1991 [IT] Italy .................. MI 91 A 001378

[51] Int. Cl.$^5$ ............................................. A01K 7/00
[52] U.S. Cl. ................................. 119/158; 119/14.01; 15/24; 15/29
[58] Field of Search .............. 119/158, 174, 14.01; 15/24, 29

[56] References Cited

U.S. PATENT DOCUMENTS

| | | | |
|---|---|---|---|
| 2,228,698 | 1/1941 | Fitches | 119/158 |
| 2,952,860 | 9/1960 | George | 15/29 |
| 3,138,815 | 6/1964 | James | 15/24 |
| 3,713,423 | 1/1973 | Sparr | 119/158 |
| 4,305,346 | 12/1981 | Sparr | 119/158 |

FOREIGN PATENT DOCUMENTS

| | | | |
|---|---|---|---|
| 2501965 | 9/1982 | France . | |
| 7504885 | 10/1975 | Netherlands | 119/158 |
| WO89/00378 | 1/1989 | PCT Int'l Appl. . | |
| 174034 | 8/1965 | U.S.S.R. | 119/158 |

*Primary Examiner*—John G. Weiss
*Attorney, Agent, or Firm*—Christensen, O'Connor, Johnson & Kindness

[57] ABSTRACT

A device for automatically washing and drying teats of generic dairy animals comprises a portable washing head whereto a teat-cleansing liquid is supplied through an interspace defined in a flexible member.

2 Claims, 2 Drawing Sheets

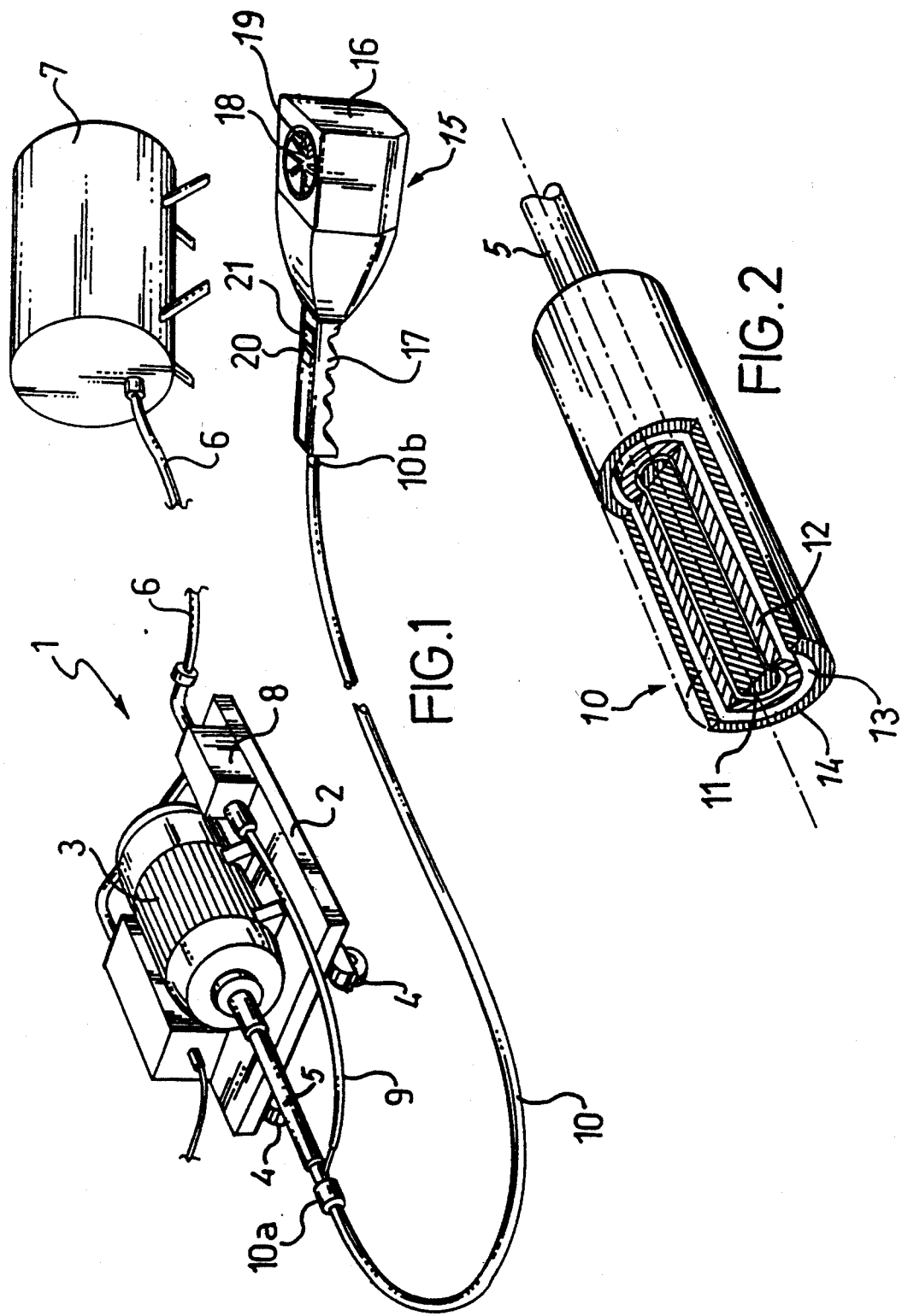

DEVICE FOR AUTOMATICALLY WASHING TEATS OF DAIRY ANIMALS

BACKGROUND OF THE INVENTION

This invention relates to a device for automatically washing and drying teats of generic dairy animals, of a type which comprises a washing head equipped with rotary brushes, a drive means to generate torque, at least a tank for storing washing liquids, a pumping means for pumping said liquids to the washing head, a first means for conveying the washing liquids from the storage tank to the pumping means, a second means for conveying the washing liquids from said pumping means to the washing head, a drive cable for transferring the drive torque to the rotary brushes from said drive means.

Before milking generic dairy animals, specifically dairy cattle, it is common practice to perform a teat washing operation to remove any incrustations and bacterial spores, as may have formed thereon and that would contaminate the milk during the milking operation.

This washing operation, as well as a teat drying operation that generally follows it, is carried out using a specially designed teat washing head; this head generally consists of a box-type body which has rotary brushes active therein.

The box-type body is provided with a bore wherethrough a teat of the animal can be introduced into the body and which is formed in such a position that the introduced teat is brought to contact with the bristles of the rotary brushes and brushed clean.

The washing heads of the prior art are completed by a set of minute ducts arranged to direct washing liquids toward the box-type body interior; these liquids help the action of the brushes.

The washing liquids which may be just plain water or water having detergents dissolved therein are stored in and dispensed from, small external tanks separated from the washing heads, and are delivered to the latter by means of pumps associated with the tanks and delivery ducts With such equipment, moreover, after each teat is washed, the teats can be dried by operating the washing heads with no liquids passed therethrough.

Accordingly, the term "teat washing" as used hereinafter, where not otherwise specified, will also imply drying of the same, since being an operation carried out in a analogue manner just explained.

The rotary brushes of conventional teat washing heads, in general, are coupled to gears which are also accommodated within the box-type body and driven through conventional drive means.

Such drive means are usually oil, air or otherwise operated, but preferably not electrically operated because electric motors tend to be unwelcomed by the animal, highly sensitive to electricity.

Further, in different embodiments of the equipment, the drive would be alternatively mounted on the box-type body or provided separate therefrom.

The sketchy description just provided of state-of-the-art teat washing heads for dairy animals already hints at some inherent deficiencies thereof.

In fact, in dairy farms where preliminary teat washing procedures are carried out before milking, each milker is to carry out the operation on a large number of animals; in addition, the operation has to be carried out in confined spaces and in inconvenient positions for the operator.

It is therefore important that the teat washing operation can be quickly performed in a flexible manner, ensuring that all the animals can be conveniently reached, no matter how these are stationed.

The washing heads provided in the prior art cannot accomplish this.

Indeed, to have the washing liquids delivered to such prior heads, the pump associated with each liquid storage tank must be operated each time; likewise, to set the brushes within the box-type case to rotate, the drives must be operated, which may prove difficult.

Both actions indeed keep at least one operator's hand busy, and distract him to some extent from the teat washing operation proper, obliging him to perform it with just one hand or, in the extreme, to interrupt it altogether.

This happens because neither the tanks with their pumps nor the drives are easy to reach for the operator, due to the usually confined spaces in which he is to work.

Further the operator, in order to have the equipment ready at hand for teat washing on several animals, is to take it along every time that he moves from one station to another.

It may be appreciated, therefore, that the tanks and drives—both essential to the operation of the washing head described as above—have a drawback in that they hinder smooth performance of the teat washing process.

The underlying technical problem of this invention is to provide a device for automatically washing teats of generic dairy animals with such constructional and functional characteristics as to overcome the aforementioned drawbacks with which the prior art is beset.

This problem is solved by a device as indicated being characterized as in the appended claims.

BRIEF DESCRIPTION OF THE DRAWINGS

Further features and the advantages of this invention will become apparent from the description of an embodiment thereof, given by way of non-limitative example with reference to the accompanying drawings.

In the drawings:

FIG. 1 is a perspective view of the device according to the invention;

FIG. 2 is a cut-away perspective detail view of a coaxial hose included in the device of FIG. 1.

DETAILED DESCRIPTION OF THE PREFERRED EMBODIMENT

Figure 3:
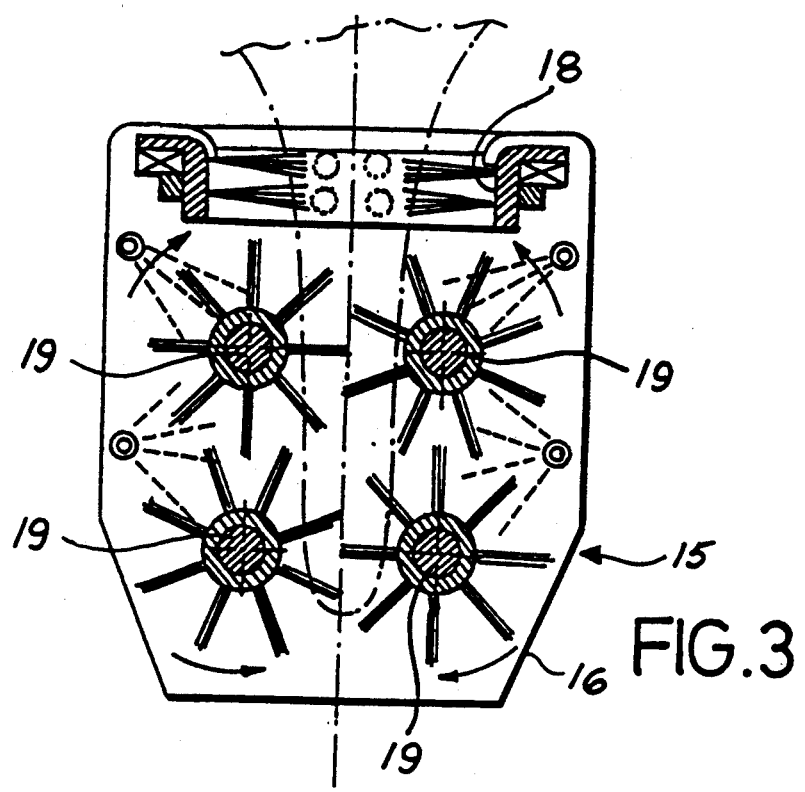
FIG. 3 is a cross-sectional view of the washing head of FIG. 1, taken along a plane orthogonal to the longitudinal axis of the hose.

With reference to the drawing figures, a device according to the invention is generally shown at 1 and comprises a trolley 2 carrying conventionally operated motor 3 to generate drive torque.

Advantageously, the trolley 2 is mounted on wheels 4 making it easy to tow across a surface on which the trolley would be laid.

The motor 3 output is coupled to a flexible drive cable 5 for transferring the drive torque.

A feed pipe 6 for supplying washing liquids from a tank 7 incorporated to the trolley 2 is connected to the suction side of a pump 8 attached to the trolley 2. The delivery side of the pump 8 has a fitting 9 terminating, along with the flexible cable 5, into a first end 10a of a member 10 in the form of a coaxial hose.

The coaxial hose member 10 includes, respectively distributed from the inside out in cylindrical geometry, a core 11 wherein the flexible cable 5 is housed, being enclosed within a waterproof inner sleeve 12.

Externally of the waterproof sleeve 12 is an annular interspace 13 delimited by an outer sleeve 14 of the hose member 10.

The coaxial hose member 10 is connected at a second end 10b to an automatic teat washing head 15 of the kind outlined in teh prior art.

This washing head basically comprises a box-type case 16 provided with a handgrip 17 jutting out of said case; the latter also has an opening 18 for introducing a teat thereinto. Active inside the box-type case 16 are rotary brushes 19 (FIGS. 1 and 3) that are coupled to a second end of the drive cable 5 by gearing (not shown). The rotary brushes 19 are arranged about the opening 18 to brush and clean a teat introduced thereinto. On the handgrip 17 of the case 16 there are provided a pair of control pushbuttons, 20 and 21, for the brushes and the flow of washing liquids through the washing head, respectively.

The operation of the present invention is next described.

An operator in charge of the teat washing operation preliminarly to milking will grasp the head 15 at its handgrip 17, and introduce a teat into the box-type case 16; by operation of the pushbuttons 20 and 21 provided on the handgrip 17, the operator can wash the teat in a most simple manner even in confined spaces.

In fact, said pushbuttons respectively control the brush rotation and delivery of the washing liquids to the box-type case interior. More particularly, the motor 3 ensures, through the flexible cable 5, that the required drive torque is transferred to the brushes for rotating them, while the pump 8 supplies the washing head with liquids drawn from the tank and forced into the annular interspace 13 up to the box-type case interior.

Once the teat washing operation is completed on a first animal, one can most simply move to washing the next. In fact, by again operating the pushbuttons 20 and 21, the operator stops the brush rotation and cuts off the delivery of washing liquids to the washing head, while comfortably pulling the trolley 2 along to the next animal to be treated as just described.

By suitable selection of the pipe 6 length, the tank 7 can be left where it is, with the washing liquid delivery being continued as normal by the pump 8 on the trolley 2.

The motor 3 and flexible cable 5 mounted on the trolley ensure the drive torque required to operate the rotary brushes.

With the device of this invention, a large number of dairy animal teats can be washed automatically in the most practical way.

The washing of many animals requires, in fact, a plentiful supply of liquid; with the inventive device, the liquid can be easily stored in large amounts within the large-capacity tank 7 with no need to move it around and none of the problems that this could bring about.

Additionally, by having the device implemented with the flexible cable for driving the rotary brushes and the interspace wherethrough the washing liquid is flown merged into a single coaxial hose member 10, the washing head 15 can be simplified, from a constructive point of view, to only require a single fitting for the coaxial hose 10 intended for its operation.

It cannot be excluded that different embodiments of the device according to the invention are possible to promote flexibility of application under different operating conditions. For example, one could think of running the trolley on which the pump and motor are mounted along specially provided tracks that could be alternatively laid on the floor or on the walls of the enclosures wherein the animals are washed.

One could also provide the device alternatively to the two pushbuttons 20 and 21 with a remote control operating on electromagnetic waves, whereby the operator can turn on and off either the washing liquid feed pump and the motor coupled to the flexible drive cable.

Lastly, while the embodiment described above includes a single storage tank for the washing liquid, the washing operation could be also carried out using a number of tanks filled with different liquids adapted for washing as well as rinsing the animal teats to be washed, for example. The device of the previous example would then be slightly modified by the provision of several dedicated tanks for each liquid.

None of these variants alter the essence of this invention as defined in the claims which follow.

We claim:

1. A device for automatically washing and drying teats of generic dairy animals, of a type which comprises a washing head equipped with rotary brushes, a drive means to generate torque, at least a storage tank for storing washing liquids, a pumping means for pumping said liquids to the washing head, a first means for conveying the washing liquids from the storage tank to the pumping means, a second means for conveying the washing liquids from said pumping means to the washing head, a drive cable for transferring the drive torque to the rotary brushes from said drive means, characterized in that said second conveying means comprises an interspace defined between an outer sleeve and said drive cable, said interspace being coaxial with the drive cable.

2. A device according to claim 1, characterized in that said drive means and pumping means are accommodated on a wheel-mounted trolley.

* * * * *